May 13, 1924.

G. A. CAMPBELL

WAVE FILTER

Filed June 12, 1918      3 Sheets—Sheet 1

INVENTOR.
G. A. Campbell
BY G. E. Folk,
ATTORNEY

May 13, 1924.

G. A. CAMPBELL

WAVE FILTER

Filed June 12, 1918

INVENTOR
G. A. Campbell
BY G. E. Folk,
ATTORNEY

Infra-Filters

Ultra-Filters

Patented May 13, 1924.

1,493,600

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

WAVE FILTER.

Application filed June 12, 1918. Serial No. 239,576.

*To all whom it may concern:*

Be it known that I, GEORGE A. CAMPBELL, residing at Montclair, in the county of Essex and State of New Jersey, have invented certain Improvements in Wave Filters, of which the following is a specification.

This invention relates to a form of wave-filter for use in electric lines and circuits where it is desired to transmit alternating current of selected frequencies and to suppress or partly suppress currents of other frequencies. More specifically it relates to a special form of filter of the general type disclosed and claimed in my prior Patents, Nos. 1,227,113 and 1,227,114, issued May 22, 1917.

The invention has among its objects the production of a wave-filter which is capable of sharper discrimination between frequencies in the transmitted and suppressed ranges than the specific forms of filter which are shown and described as examples of the general type in said patents.

The invention comprehends as specialized forms ultra- and infra-filters, the former term designating a filter which suppresses frequencies above a definite limit, the latter being applied to a filter which suppresses frequencies below a definite limit. These two types of filters may also be distinguished as low pass and high pass, the low pass filters being those which pass low frequencies and the high pass filters being those which pass high frequencies. The limiting frequency between a range of passed frequencies and a range of suppressed frequencies is referred to as the critical frequency. On one side of the critical frequency is a transmission range of frequencies, and on the other side there is a range of suppressed frequencies.

This invention has important applications in connection with radio telegraphy, radio telephony, multiplex high frequency wire telephony, composite telegraph and telephone lines and telephone repeater circuits, but is not limited to such uses.

For a more complete understanding of the invention reference may be had to the accompanying drawing in which:

Fig. 4 is a diagrammatic view similar to that of Fig. 3 showing, for purposes of comparison, the distribution of bands for one form of the filter shown in my prior patents above referred to.

Figure 1:
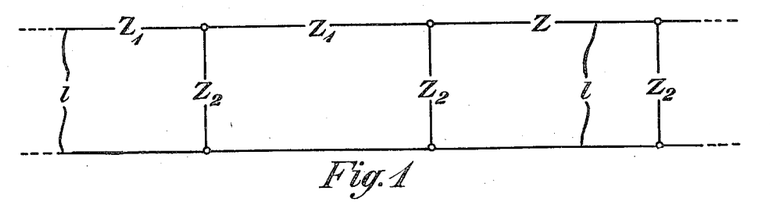
Figure 1 is a diagrammatic view showing the general form of the wave-filter and Fig. 1ª is a view of a special form of filter described by me and shown in Fig. 1 of each of the above identified patents.
Figure 1A:
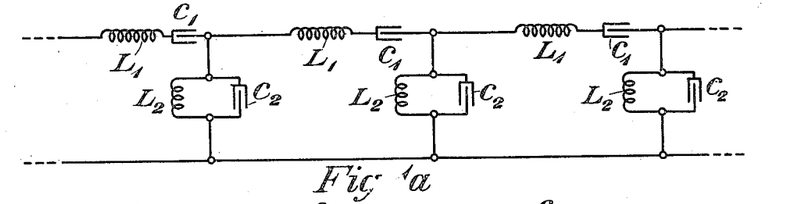
Figure 4:
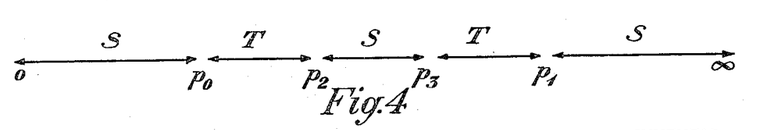

A comparison of the filter of this invention with the filter which forms the subject-matter of the above identified patents is herein made for the purpose of clearly bringing out the characteristics of the present form. The wave-filter in its broadest scope consists of one or more sections of impedance placed in an electric line or circuit and so designed that the structure will transmit, with negligibly small attenuation currents of all frequencies lying within the specified and predetermined limits, while attenuating and sensibly extinguishing currents of neighboring frequencies lying outside those limits. Each of these impedance elements comprises a lumped impedance in series with the line and a lumped impedance in shunt across the line, as shown diagrammatically in Fig. 1 the line being denoted by 1, 1, series impedance by $Z_1$ and shunt impedance by $Z_2$. The impedance in each case may be provided by condensers or inductance coils alone, or grouped together. Figure 1ª illustrates that form of the wave-filter in which the impedance $Z_1$ of Figure 1 is provided by a condenser $C_1$ and an inductance coil $L_1$ in series with each other and the impedance $Z_2$ comprises condenser $C_2$ and inductance coil $L_2$ in parallel with each other. This is one of the special cases described in my prior patents above identified. As explained in said patents, one or more of the condensers and coils may be omitted, there being for each section of the filter, as there specifically disclosed, at least one inductance element in series with the line and one capacity element in shunt across the line or vice versa. In said patents mathematical formulæ are developed for determining the values of capacity and inductance which will give the desired range of transmitted or suppressed frequencies in each case. It is shown that, in the special case shown in Figure 1ª, with all the impedance elements present, two bands of frequencies are in general transmitted and all other frequencies suppressed. This is represented in Fig. 4 in which the sectioned lines covers the entire range of frequencies from zero to infinity. The bands of frequencies which are transmitted are represented by T, T, and the bands which are suppressed by S, S, S. The limiting frequencies for the bands T, T, are represented by $p_0$ and $p_2$ for one band and $p_1$ and $p_3$ for the other band. The frequencies $p_0$, $p_1$, $p_2$ and $p_3$ are dependent upon the values of $L_1$, $L_2$, $C_1$ $C_2$.

Figure 2:
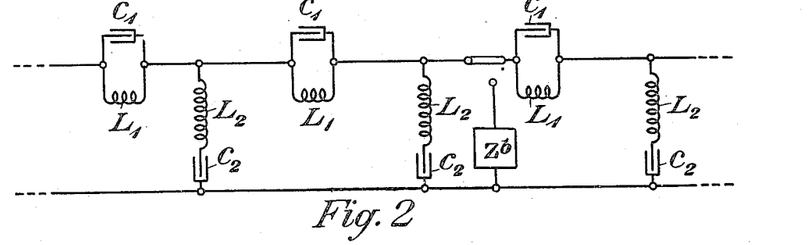
Fig. 2 is a diagrammatic view of a form of wave-filter according to this invention.

One form of the present invention is shown in Fig. 2, which bears a resemblance to that shown in Fig. 1ª, but is distinguished therefrom in that in Fig. 2 the group of impedance elements which are in shunt with each other are in series with the line and those which are in series with each other are in shunt with the line, this being, in a sense, the reverse of the arrangement shown in Fig. 1.

Figure 5:
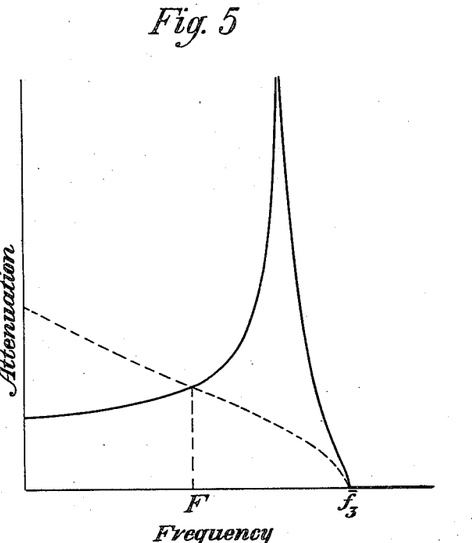
Figs. 5 and 6 are diagrammatic views showing the relation between the frequency of the transmitted current and the attenuation of the current produced by passage through the wave-filter, separate curves being shown for the wave-filter in my prior patents and that of this invention.
Figure 6:
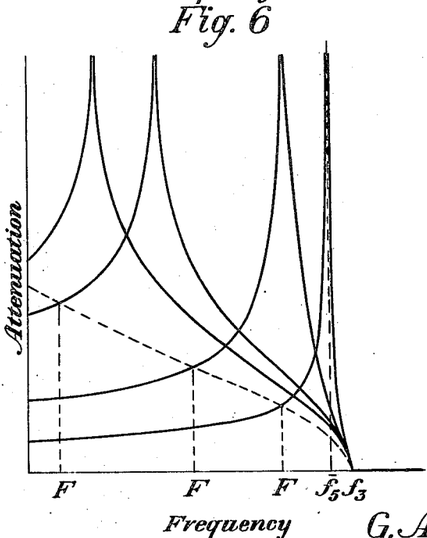

It has been found that the characteristics of the two types differ materially and that the one comprehended by this invention is admirably adapted to form infra and ultra-filters because of its property of sharply or abruptly terminating a band of transmitted frequencies at one edge of the band. This property is illustrated in Figs. 5 and 6 in which the ordinates represent the attenuation of the current per section of the wave-filter and the abscissæ the frequency $f$. In the following description the frequencies are for convenience more often denoted by $p$ than by $f$, it being understood that $p$ denotes $2\pi f$. The broken line curves represent the characteristics of the infra-filter of my previous patents and the solid line curves show the characteristics of infra-filters according to this invention. The two curves coincide in that part of each which lies upon the axis of abscissæ and extends to the right of the point $\bar{f}_3$. The solid line curves of Figs. 5 and 6 are those for the infra-filter shown in Fig. 7, but it is understood that these are typical of the curves of all infra-filters according to this invention and are given merely by way of example. The band of transmitted frequencies therefore extends from the point $\bar{f}_3$ to the right, the transmitted frequencies coinciding with that portion of the curve which coincides with the axis of abscissæ. As shown in Fig. 6 the filter of this invention may be designed to terminate the band more or less abruptly as desired, four different examples being shown.

The important feature of the characteristic curve is that it becomes infinite at a finite frequency (other than zero). In practice the resistance of the structure, which has not been considered in the above discussion will prevent the attenuation from attaining this infinite value, but the actual value will be so great that it may be considered infinite for all practical purposes.

It will further be noted that the lower portion of the descending branch of the solid line curves of Figs. 5 and 6 lies below the dotted line curve. This signifies that between the frequencies $f_3$ and F the attenuation of the filter of this invention is greater than that of the filters of my previous patents, while between the frequencies O and F the attenuation is less, F denoting the frequency at which the attenuation is the same for both filters.

The corresponding curves for ultra-filters are not shown since they differ from those of infra-filters only by being reversed.

Figure 3:
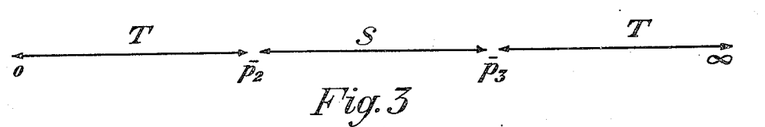
Fig. 3 is a diagrammatic view showing the distribution of suppression and transmission bands produced by the filter of this invention in its more general form.

Applying the general equations developed in my prior patents to the special case of this invention, we are able to obtain a series of equations, defining limiting frequencies of transmission bands, from which it is found that the bands are as shown in Fig. 3. A comparison of the bands of this figure with Fig. 4 shows the changes in number and distribution produced by the reversal of the impedance elements of Fig. 1ª in the manner described. We have here a second difference between the filter of this invention and that of my prior patents shown in Fig. 1ª. With all the four impedance elements present in the latter form there are in general five bands of frequencies between zero frequency and infinite frequency, as explained above. With all four elements present in the form of filter according to this invention there are but three bands, namely a transmission band from O to $\bar{p}_2$, a suppression band from $\bar{p}_2$, to $\bar{p}_3$ and a transmission band from $\bar{p}_3$ to ∞. As explained in the patents above identified the two transmission bands of Fig. 4 may be made to coalesce by making $L_1 C_1 = L_2 C_2$. The arrangement of bands, moreover, may be made to consist of a single transmission band bounded by a suppression band upon either side by making $L_1$ or $C_2 = 0$ or $L_2$ or $C_1 = \infty$.

The equations referred to above, from which the limiting values of the transmission and suppression bands may be found, are designated (5) and (6) below, and are derived by applying the general equations developed in my prior patents to the special case comprised in this invention.

Denoting the propagation constant of the structure shown in Fig. 1 by $\Gamma$ it has been shown in said patents that $$\cosh \Gamma = 1/2 \frac{Z_1}{Z_2} + 1 \quad (1)$$

and that the condition for non-attenuated transmission is that $\cosh \Gamma$ shall lie between $+1$ and $-1$, and hence, that the limiting value of frequencies of free transmission are given by $$\frac{Z_1}{Z_2} = 0 \text{ or } Z_1 = -4Z_2 \quad (2)$$

The values of $Z_1$ and $Z_2$ for the case we are considering are respectively:

$$Z_1 = \frac{ipL_1}{1 - L_1 C_1 p^2} \quad (3)$$

and $$Z_2 = \frac{1 - L_2 C_2 p^2}{ipC_2} \quad (4)$$

where $p = 2\pi f$, $f =$ the frequency in cycles per second, and $i$ is the imaginary quantity $\sqrt{-1}$.

Substituting the values of $Z_1$, $Z_2$ in equation (2) and solving the resultant equations, it is found that aside from zero and infinity there are only two roots or two values of $p$ which will satisfy the conditions. If these two values of $p$ are denoted by $\bar{p}_2$ and $\bar{p}_3$ $$\bar{p}_2 = \sqrt{\frac{u - \sqrt{u^2 - 8v}}{v}} \quad (5)$$

$$\bar{p}_3 = \sqrt{\frac{u + \sqrt{u^2 - 8v}}{v}} \quad (6)$$

where for brevity $4L_2 C_2 + 4L_1 C_1 + L_1 C_2$ is denoted by $u$ and $8L_1 C_1 L_2 C_2$ is denoted by $v$.

It is obvious that these two values of $p$ must define three bands, one extending from $\bar{p}_3$ to infinity, one from $\bar{p}_2$ to $\bar{p}_3$ and the third from zero to $\bar{p}_2$, the two outside bands being transmission bands. Unless $\bar{p}_2$ and $\bar{p}_3$ have such values that the two bands coalesce there will be a suppression band between the two transmission bands, as shown in Fig. 3. In general, coalescence will not occur, as is easily seen from an examination of equations (5) and (6).

Referring again to equation (1) it is obvious that if $Z_1 = \infty$, or $Z_2 = 0$, $$\cosh \Gamma = \infty \quad (7)$$

But from equations (3) and (4) it is seen that if $Z_1$ is infinite $$p = \sqrt{\frac{1}{L_1 C_1}}$$

and if $Z_2$ is zero $$p = \sqrt{\frac{1}{L_2 C_2}}$$

Denoting these two special values of $p$, by $\bar{p}_4$ and $\bar{p}_5$ respectively, we may write the above equations as $$\bar{p}_4 = \sqrt{\frac{1}{L_1 C_1}} \quad (8)$$

$$\bar{p}_5 = \sqrt{\frac{1}{L_2 C_2}} \quad (9)$$

But $\cosh \Gamma$ can be infinite only when the real part of $\Gamma$ is infinite. The real part of $\Gamma$ is taken as the measure of attenuation. It follows that at the frequencies $\bar{p}_4$ and $\bar{p}_5$ the attenuation becomes infinite. It is due to this characteristic that the form of filter of this invention has a sharp "cut-off," that is, that it is able to discriminate sharply between frequencies lying on opposite sides of the limiting frequency of a suppression band and a transmission band.

By means of equations (5), (6), (8) and (9) it is possible to compute in advance the values of inductance and capacity which should be used in order that the filter may suppress any desired band of frequencies. This band will extend between $\bar{p}_2$ and $\bar{p}_3$. One of the frequencies $\bar{p}_4$, $\bar{p}_5$ at which the attenuation becomes infinite may also be specified. It is not possible to specify all four quantities $\bar{p}_2$, $\bar{p}_3$, $\bar{p}_4$ and $\bar{p}_5$ because, as appears from an examination of equations (5), (6), (8) and (9)

$$\bar{p}_2 \bar{p}_3 = \bar{p}_4 \bar{p}_5 \quad (10)$$

These quantities are not, therefore, independent. Consequently there are only three conditions imposed upon the four quantities $L_1$, $C_1$, $L_2$, $C_2$, and one of these four quantities may be chosen arbitrarily or may be made to satisfy a fourth preassigned condition. In practice it is frequently desirable to use as this fourth condition the "iterative impedance" of the device for large or for small frequencies.

The reason for considering the "iterative impedance" is that the above discussion assumes that the network forming a filter is infinite in length. Since filters must be finite in length it is necessary to determine the impedance with which a given filter should be terminated in order that it may behave as nearly as possible like an infinite network. It is obvious that this terminal impedance should be the same as the impedance of that portion of the corresponding infinite filter which has been neglected. This impedance is known as the "iterative impedance."

It can be shown that this impedance approaches the value $$\sqrt{\frac{L_1}{C_2}}$$

when $p$ is small and $$\sqrt{\frac{L_2}{C_1}}$$

when $p$ is large, and that the impedance remains nearly enough constant for large values of $p$ and also nearly enough constant for small values of $p$ when these large or small values of $p$ lie in a transmission band so that it is in practice usually necessary to consider only these two values of this impedance. It has been found, also, that when $p$ is either very small or very large the iterative impedance is the same regardless of the point of termination of the section so that only the two values of iterative impedance mentioned need be considered. Denoting these special values of the iterative impedance by $Z_{po}$ when $p$ is small, $Z_{poo}$ when $p$ is large, we may write $$Z_{po} = \sqrt{\frac{L_1}{C_2}} \quad (11)$$

$$Z_{poo} = \sqrt{\frac{L_2}{C_1}} \quad (12)$$

In Figs. 2, 7, 8, 9 and 10 the discussion heretofore has been on the basis that the recurrent structure extended indefinitely to the right, as indicated by the dotted lines. But, according to the immediately foregoing discussion, the infinite repeated extension of the filter sections must in practice be replaced by a finite terminal network of suitable impedance. This is shown at the right in each of Figs. 2, 7, 8, 9 and 10, and the switch is also shown by which the theoretical infinite extension to the right can be disconnected and connection made with the finite terminal impedance structure $Z_b$. As explained in the foregoing part of this specification, $Z_b$ is constructed so as to have the iterative impedance value given in equation 11 or 12, according as the filter is low-pass or high-pass.

Equation (11) is useful in the design of ultra-filters where the transmission band includes small values of $p$ and equation (12) is used in the design of infra-filters where the transmission band includes large values of $p$.

Since either of the equations (11) and (12) is compatible with the equations (5) and (6) and one of the equations (8) and (9) it follows that these four conditions may be satisfied in advance, and taken as the four conditions necessary to uniquely determine $L_1, C_1, L_2, C_2$.

Figure 7:
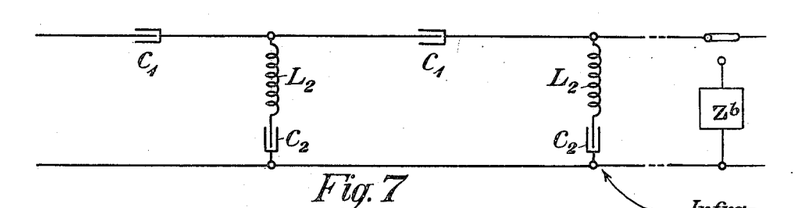
Figs. 7 and 8 are diagrammatic views of infra-filters according to this invention.
Figure 8:
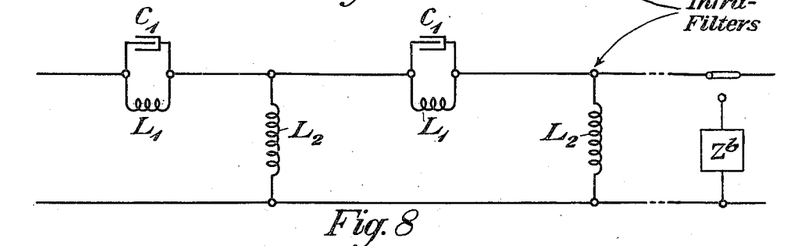
Figure 9:
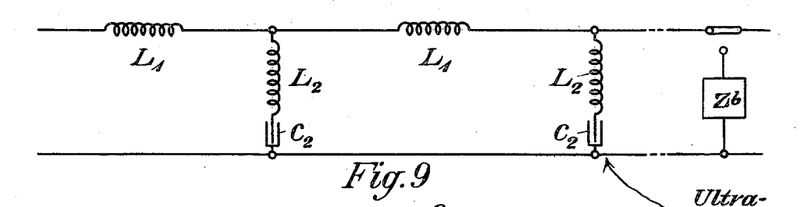
Figs. 9 and 10 are diagrammatic views of ultra-filters according to this invention.
Figure 10:
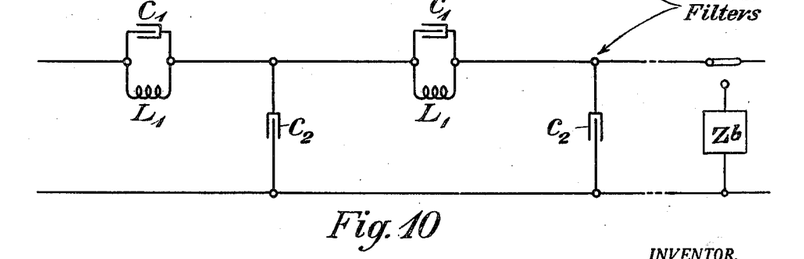

The values of $\bar{p}_2, \bar{p}_3$ depend upon $L_1, C_1, L_2, C_2$, as is shown above. By making $L_1$ or $C_2$ equal to infinity, $\bar{p}_2$ equals 0; and by making $L_2$ or $C_1$ equal to 0, $\bar{p}_3$ is infinite, as is evident from an examination of equations (5) and (6). To make the value of an inductance element equal to infinity with respect to the circuit in which it is placed it is only necessary for all practical purposes to remove the element from the circuit and leave the circuit open at that point. To make such element equal to 0 the element may be removed and the circuit closed at that point. Similarly the value of a capacity element may be made equal to infinity by removing it and closing the circuit at that point, or may be made equal to zero by removing it and leaving the circuit open at that point. In this way infra and ultra-filters may be formed. These forms of filter are shown in Figures 7 to 10, and characteristic curves of infra-filters are shown in Figures 5 and 6. Figures 7 and 8 show infra-filters, inductance $L_1$ of Figure 2 being made equal to infinity in Figure 7 by omitting it and leaving its circuit open and $C_2$ being made equal to infinity in Figure 8 by omitting it and closing this circuit at that point. Figures 9 and 10 show ultra-filters, capacity $C_1$ of Figure 2 being made equal to zero in Figure 9 by omitting it and leaving its circuit open and inductance $L_2$ being made equal to zero in Fig. 10 by omitting it and closing the circuit at that point.

As explained above, one of the frequencies $\bar{p}_4, \bar{p}_5$ at which the attenuation for a given band becomes infinite may be chosen by properly fixing values of $L_1, C_1, L_2, C_2$. By choosing the value of $\bar{p}_4$ very near to the limiting frequency $\bar{p}_2$ for an ultra-filter or $\bar{p}_5$ very near to $\bar{p}_3$ for an infra-filter, such a filter may be given a very sharp "cut-off." This is illustrated in Figure 6 by the right-hand curve. This characteristic of the filter of this invention is of great importance in the art as it is ordinarily desirable to discriminate as sharply as possible between transmitted and suppressed frequencies.

To illustrate the method to be used in designing a wave filter to satisfy any preassigned requirements, consider the following: It is assumed that an infra-filter of the form shown schematically in Figure 7 is wanted; that is, a filter in which $L_1$ is infinite. The equations (6), (9), and (12) determine the remaining constants $L_2, C_1, C_2$.

Upon putting $L_1$ equal to infinity in equation (6)

$$\bar{p}_3 = \sqrt{\frac{C_1 + 1/4C_2}{C_1 C_2 L_2}} \quad (13)$$

Solving equations (9), (12) and (13) for the three quantities $C_1$, $C_2$, $L_2$ the following design formulæ are obtained:

$$C_1 = \frac{1}{2Z_{p\infty}\bar{p}_5\sqrt{\left[\frac{\bar{p}_3}{\bar{p}_5}\right]^2 - 1}}$$

$$C_2 = \frac{2\sqrt{\left[\frac{\bar{p}_3}{\bar{p}_5}\right]^2 - 1}}{Z_{p\infty}\bar{p}_5}$$

$$L_2 = \frac{Z_{p\infty}}{2\bar{p}_5\sqrt{\left[\frac{\bar{p}_3}{\bar{p}_5}\right]^2 - 1}}$$

It is understood that it may be desirable to neglect the iterative impedance, in which case some other condition, as that the filter shall have a desired impedance for a particular frequency, may be specified in order to fix the values of $L_1$, $C_1$, $L_2$, $C_2$. One of these quantities may be fixed arbitrarily, if desired, the others being then computable from the general equations (5) and (6) and equations expressing other conditions which it is desired to impose, as for example, equations (8) and (9).

It will be understood that the examples given are by way of illustration only and that they in no way limit the invention, which is defined in the claims.

What is claimed is:

1. A wave-filter for electric circuits comprising an impedance element in series with the circuit and a capacity element and an inductance element in series with each other and in shunt to the circuit adjacent to the impedance element, said elements being so proportioned that currents of frequencies lying within a range of frequencies are approximately suppressed by the structure, with a maximum of suppression at a frequency close to the end of said range, currents of other frequencies being transmitted with substantially equal freedom.

2. A wave-filter for electric circuits comprising a capacity element in series with the circuit, and a capacity element and an inductance element in series with each other and in shunt with the circuit adjacent to the capacity element, said elements being so proportioned that currents of frequencies lying within a range of frequencies are approximately suppressed by the structure, with a maximum of suppression at a frequency close to the end of said range, the neighboring frequencies lying outside of said range of frequencies being transmitted.

3. A wave-filter for electric circuits comprising an inductance element in series with the circuit, and a capacity element and an inductance element in series with each other and in shunt with the circuit adjacent to the inductance element, said elements being so proportioned that currents of frequencies lying within a range of frequencies are approximately suppressed by the structure, with a maximum of suppression at a frequency close to the end of said range, the neighboring frequencies lying outside of said range of frequencies being transmitted with substantially equal freedom.

4. A wave-filter for electric currents comprising a capacity element and an inductance element in parallel with each other and in series in the circuit, and an impedance element in shunt to the circuit adjacent to the first mentioned elements, said elements being so proportioned that currents of frequencies lying within a range of frequencies are approximately suppressed by the structure, with a maximum of suppression at a frequency close to the end of said range, the neighboring frequencies lying outside of said range of frequencies being transmitted.

5. A wave-filter for electric circuits comprising a plurality of sections in serial order, each section comprising an inductance element and a capacity element in parallel with each other and in series with the circuit, and a capacity element in shunt to the circuit adjacent to the first mentioned elements, said elements being so proportioned that currents of frequencies lying within a range of frequencies are approximately suppressed by the structure with a maximum of suppression at a frequency close to the end of said range, the neighboring frequencies lying outside of said range of frequencies being transmitted.

6. A wave-filter for electric circuits comprising a capacity element and an inductance element in parallel with each other and in series with the circuit, and an inductance element in shunt to the circuit adjacent to the first mentioned elements, said elements being so proportioned that currents of frequencies lying within a range of frequencies are approximately suppressed by the structure, the neighboring frequencies lying outside of said range of frequencies being transmitted.

7. A wave-filter of the type having recurrent sections comprising inductance and capacity in parallel with each other and in series with the line and inductance and capacity in series with each other and in shunt to the line adjacent to the first mentioned inductance and capacity, whereby currents of frequencies lying within a range of frequencies are transmitted by the structure with substantially equal freedom and without appreciable attenuation while frequencies lying without the range are substantially suppressed.

8. The combination with an electric circuit of a wave filter therefor of recurrent sections, and having a definite critical frequency between adjacent pass and attenuation ranges of frequency, each section comprising shunt and series impedance combinations, one of which combinations has the kind of resonance at a finite frequency, whereby the said structure transmits currents at certain frequencies lying to one side of a limiting value with relatively small attenuation and produces a maximum of attenuation at a finite frequency different from zero upon the other side of the limiting value.

9. The combination with an electric circuit of a wave-filter therefor comprising shunt and series impedance elements so proportioned that the structure transmits currents having frequencies lying to one side of a limiting value and attenuates currents of frequencies lying to the other side of said limiting value, the attenuation first increasing and then decreasing as the frequency varies from the limiting value to those at which attenuation occurs.

10. A wave-filter for electric circuits comprising lumped impedance in series in the circuit and lumped impedance in shunt to the circuit, the said impedance being so proportioned that as the frequency of the current in the circuit varies in one direction from a chosen finite value the attenuation of the current by the structure increases from approximately zero to a practically infinite value for a finite frequency differing from zero.

11. A wave filter for electric circuits comprising an impedance element in series in the circuit and an impedance element in shunt across the circuit, one of said impedance elements comprising an inductance element and a capacity element of such values and so disposed that the structure transmits with substantially equal freedom currents of certain frequencies lying to one side of a finite limiting value and attenuates and approximately suppresses currents of frequencies lying on the other side of such limiting value, with a maximum of suppression at a frequency close to said limiting value.

12. A wave-filter for electric circuits, comprising a plurality of sections, each section having lumped impedance in series in the circuit, and lumped impedance in shunt to the circuit, said impedances being so proportioned that as the frequency of the current in the circuit varies in one direction from a chosen finite value the attenuation of the current by the structure increases from approximately zero to a practically infinite value for a finite frequency different from zero and only a little different from said chosen finite value.

13. A wave-filter for electric circuits comprising a plurality of sections, each section having an impedance element in series in the circuit and an impedance element in shunt across the circuit, one of said impedance elements comprising an inductance element and capacity element in parallel or in series according as such impedance element is itself in series or in shunt, said elements being so proportioned that the structure transmits with substantially equal freedom currents of frequencies lying to one side of a finite limiting value and attenuates and approximately suppresses current of frequencies lying upon the other side of the limiting value with a maximum of suppression at a frequency close to said limiting value.

14. A wave-filter for electric circuits comprising an impedance element in series with the circuit, and a capacity element and an inductance element in series with each other and in shunt to the circuit adjacent to said impedance element, said elements being so proportioned that currents of frequencies lying within a range of frequencies are transmitted by the structure with substantially equal freedom and without appreciable attenuation, all current of other frequencies being approximately suppressed.

15. A wave-filter of the type having recurrent sections comprising inductance and capacity in parallel with each other and in series with the line and inductance and capacity in series with each other and in shunt to the line adjacent to the first mentioned inductance and capacity, whereby currents of frequencies lying within a range of frequencies are approximately suppressed by the structure with a maximum of suppression at a frequency close to the end of said range, all current of other frequencies being transmitted without appreciable attenuation.

16. A wave-filter for electric circuits comprising lumped impedance in series in the circuit and lumped impedance in shunt to the circuit, said impedances being so proportioned that as the frequency of the current in the circuit varies in one direction from a chosen finite value the attenuation of the current by the structure increases from approximately zero to a practically infinite value for a finite frequency different from zero and as the frequency of current varies in the other direction from the chosen finite value the attenuation remains negligible for all frequencies.

17. The combination with an electric circuit, of a wave-filter therefor, comprising shunt and series impedance elements so proportioned that the structure transmits current at frequencies lying to one side of a limiting value with negligible attenuation and produces practically infinite attenuation at a finite frequency different from zero upon the other side of the limiting value, and a terminal network for said wave-filter, said network having the same impedance value as the iterative impedance of the corresponding infinitely extended filter at the extreme frequency of its transmitting range away from the critical frequency.

18. A wave-filter for electric currents comprising a capacity element and an inductance element in parallel with each other and in series in the circuit and an impedance element in shunt to the circuit adjacent to the first mentioned elements, said elements being so proportioned that currents of frequencies lying within a range of frequencies are approximately suppressed by the structure, the neighboring frequencies lying outside of said range of frequencies being transmitted, and a terminal network for said wave-filter, said network having the same impedance value as the iterative impedance of the corresponding infinitely extended filter at the extreme frequency of its transmitting range away from the critical frequency.

19. The combination with an electric circuit of a filter therefor comprising a finite part of an infinite series of sections, each section comprising shunt and series impedance elements so proportioned that the structure transmits current at frequencies lying to one side of a limiting value with negligible attenuation and produces practically infinite attenuation at a frequency different from zero upon the other side of the limiting value, and a terminal impedance element for said filter having an impedance approximately the same as that of the omitted part of said series throughout a preassigned range of frequencies.

20. The method of producing a sharp cut-off between adjacent transmission and suppression bands of a wave filter which consists in producing a sharp maximum of series reactance compared with shunt reactance at a frequency within the suppression band close to the critical frequency of the filter.

21. A wave filter having a finite number of recurrent sections and only a single cut-off frequency, in combination with a terminal impedance whose value is the same as the iterative impedance of an infinite series of such sections, at an extreme frequency on the transmission side of the cut-off frequency.

22. A wave filter of finite periodic structure having a single predetermined cut-off frequency and a sharp maximum of series reactance compared with shunt reactance at a frequency close to the cut-off frequency on the suppression side thereof, and having an end section with the same impedance at an extreme frequency on the transmission side of the cut-off as the filter would have if its periodic structure were repeated an infinite number of times.

23. A wave filter of finite periodic structure having a certain cut-off frequency and a sharp maximum of series reactance compared with shunt reactance close thereto on the suppression side, in combination with an end section having substantially the same impedance at the prevailing frequency of operation on the transmission side of the cut-off point as the filter would have if its periodic structure were repeated an infinite number of times.

24. A wave filter of the type having recurrent sections, each section comprising a series inductance and a shunt impedance, the shunt impedance comprising an inductance and a capacity in series, the impedance values of said elements being such that there is a maximum attenuation at a frequency only a little different from the critical frequency of the filter.

25. A wave filter of the type having recurrent sections, with each section comprising a series condenser and a shunt impedance, the said shunt impedance comprising an inductance coil and a condenser in series, the impedance values of said elements being such that there is a maximum attenuation at a frequency only a little different from the critical frequency of the filter.

26. A wave filter of the type having recurrent sections, in which each section comprises a series element with capacity and inductance in parallel and a shunt element of inductance.

27. A wave filter of the recurrent section type, in which each section consists of a series element and a shunt element, the series element of each section comprising a condenser and an inductance in parallel and the shunt element of each section comprising a condenser.

28. A wave filter of recurrent sections in which each section comprises a series combination and a shunt combination, one of these two combinations being of the character to give infinite attenuation at a finite frequency on the assumption that the said combinations involve no dissipation losses.

29. The method of transmitting alternating currents over a circuit of recurrent sections with suppression of a band of frequencies and free transmission over the frequency range on at least one side thereof, which consists in developing a sharp maximum of reactance in series or susceptance in shunt at a finite frequency within the suppression band.

30. In combination, a wave filter of the type having a plurality of recurrent sections, and a circuit connected thereto, said circuit having its impedance the same at the prevailing frequency of operation as that of a filter having an infinite series of sections like those of the filter to which said circuit is connected.

31. In combination, a wave filter of the type having a plurality of recurrent sections, a transmission circuit connected thereto, and an interposed impedance element, such that the resultant impedance of said element and said circuit, looking from the filter, is the same as of an infinite series of sections of said filter.

32. A wave filter comprising a plurality of reactive elements of four values, disposed in two kinds of combinations, one kind of combination consisting of two opposite reactances in parallel and the other kind of combination consisting of two opposite reactances in series, the combinations of the said one kind being in series and the combinations of the said other kind being in shunt, and the combinations of the two kinds alternating successively, three of the said four values being substantial and finite, said four values, said elements being so proportioned and related that the ratio of the frequency at which maximum suppression occurs to the frequency at which suppression begins closely approaches unity.

In testimony whereof, I have signed my name to this specification this seventh day of June, 1918.

GEORGE A. CAMPBELL.